UNITED STATES PATENT OFFICE.

W. R. THOMAS AND MORGAN EMANUEL, JR., OF CATASAUQUA, PA.

IMPROVEMENT IN BLASTING-POWDER.

Specification forming part of Letters Patent No. 37,117, dated December 9, 1862; Reissue No. 1,437, dated March 17, 1863.

*To all whom it may concern:*

Be it known that we, W. R. THOMAS and MORGAN EMANUEL, Jr., both of Catasauqua, in the county of Lehigh and State of Pennsylvania, have invented a new and useful Improvement in Blasting Compounds; and we do hereby declare that the following is a full, clear, and exact description of the same.

This invention relates particularly to the blasting compound for which we obtained a patent on the 9th of April, 1861, and more especially to that for which we obtained a patent on the 11th of March, 1862, and is intended to be an improvement on both those compounds, and, therefore, the subject of a patent subordinate to one or both said previous patents. The subject-matter of the former of said patents consisted in the contrivance by which the deliquescing property of nitrate of soda was so far overcome that this salt could be used as a substitute for the more expensive ingredient—saltpeter—usually employed in the composition of explosive powder. The last-named patent, that of March 11, 1862, had for its subject-matter the contrivance by which not only could nitrate of soda be used in the formation of a blasting compound, but also chlorate of potash could be employed for the same purpose without the danger of the powder being ruined by the attraction of the moisture on the one hand, nor of its being unsafe on account of its liability to explode by percussion or friction on the other hand. These purposes are accomplished by the contrivances respectively set forth in those patents, but not quite as perfectly and completely as we think desirable. We have ascertained that both objects may be more fully attained by the use of starch in the manner hereinafter set forth.

The proportions of the several ingredients which we have found by experiment to make a useful blasting-powder are as follows: nitrate of soda, seven and a half pounds; flowers of sulphur, two pounds; chlorate of potash, two pounds; ground bark, nine pounds; starch, two pounds; water, six quarts. The starch should be dissolved in a small quantity of the water in a cold state. The remainder of the water should then be heated to the boiling-point, and the nitrate of soda and the chlorate of potash should afterward be dissolved therein. The starch should then be mixed with this solution and the bark stirred in. After this the whole should be made to boil until the bark is perfectly saturated. The whole should then be poured into a box or trough and the sulphur added and mixed well with the other ingredients by stirring. When afterward dried it is ready for use.

The proportions of the above ingredients may be changed and the mode of manipulation considerably varied without materially changing the character and efficiency of the compound; but the proportions mentioned and the mode of treatment described are those which we prefer. In this case, as well as in the other blasting compounds patented by us, sawdust or other unburned carbonaceous matter may be used instead of ground bark, though we generally use the latter.

What, therefore, we claim as new, and desire to secure by Letters Patent, is—

1. In a blasting compound in which nitrate of soda and ground bark, or its equivalent, are used as two of the ingredients, the use of starch as another ingredient, when combined and compounded with the other substances substantially as described.

2. In a blasting compound in which nitrate of soda, chlorate of potash, and ground bark, or its equivalent, are used as ingredients, the use of starch as an additional ingredient, in the manner and for the purpose described.

3. The use of nitrate of soda, flowers of sulphur, chlorate of potash, starch, and ground bark, or its equivalent, when combined and compounded substantially in the manner and for the purpose above described.

WILLIAM R. THOMAS.
MORGAN EMANUEL, JR.

Witnesses:
CHAS. CORWIN,
DANIEL MILEASE.